United States Patent
Ilines

[11] 3,726,149
[45] Apr. 10, 1973

[54] PRESSURE RELIEF APPARATUS FOR POTATO DOUGH EXTRUDER

[76] Inventor: Laurence James Ilines, 7 Feldbar Court, Willowdale, Ontario, Canada

[22] Filed: Aug. 17, 1970

[21] Appl. No.: 64,357

Related U.S. Application Data

[63] Continuation-in-part of Ser. No. 819,801, April 28, 1969, abandoned.

[52] U.S. Cl. .................74/141.5, 425/192, 254/106, 100/293
[51] Int. Cl. ..........................F16h 27/02, F16h 31/00
[58] Field of Search ..............107/14 R, 14 B, 14 BA, 107/14 D, 14 DA, 1 R, 69, 54 R; 17/35–40; 18/12 R, 12 P, 13 R, 13 D, 14 R, 30 FN, 30 QD; 25/8, 11–20; 31/8, 13, 14, 46; 100/291, 293, 57; 74/531, 107

[56] References Cited

UNITED STATES PATENTS

| | | | |
|---|---|---|---|
| 3,503,342 | 3/1970 | Ilines | 107/14 R |
| 3,344,752 | 10/1967 | Ilines | 107/14 BA |
| 3,459,141 | 8/1969 | Keil | 107/54 R X |
| 2,806,385 | 9/1957 | James | 74/531 |
| 2,959,982 | 11/1960 | Cadwellader | 74/531 |
| 1,203,071 | 10/1916 | Straub | 74/531 X |
| 3,312,115 | 4/1967 | Braselmann | 74/531 X |
| 3,045,499 | 7/1962 | Dale | 74/531 X |

*Primary Examiner*—Jordan Franklin
*Assistant Examiner*—G. V. Larkin
*Attorney*—George A. Rolston

[57] ABSTRACT

A potato dough extruder incorporating an incremental manually operable pressure apparatus for manually extruding potato dough through an extrusion die which forms the dough into the shape of french fried potatoes, in which the potato dough is contained in a cylindrical container and pressure is applied to a pressure piston in the cylinder through a smooth cylindrical pressure shaft, the incremental pressure apparatus incorporating a ring-like gripping device which is slidable up and down the shaft so long as the ring is located in a plane substantially normal to the shaft, and in which the ring gripping device is tiltable out of such a plane and grasps the shaft at any point along its length thereby doing away with teeth, sprockets, and notched gripping devices and at the same time incorporating the improvement that as soon as the tilting force applied to the ring gripping device is released the pressure on the pressure shaft is also released. This particular improvement eliminates the tendency for the extrusion of the dough to continue after a single serving of french fries has been obtained from the machine.

11 Claims, 6 Drawing Figures

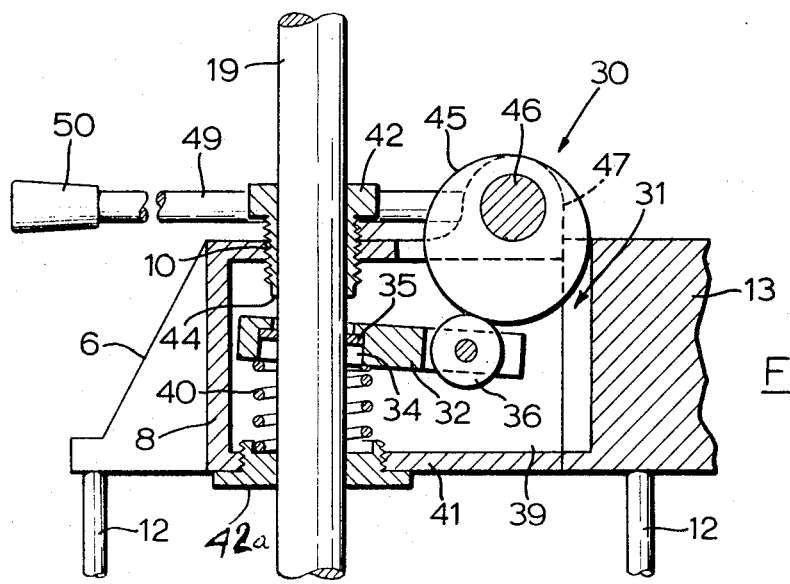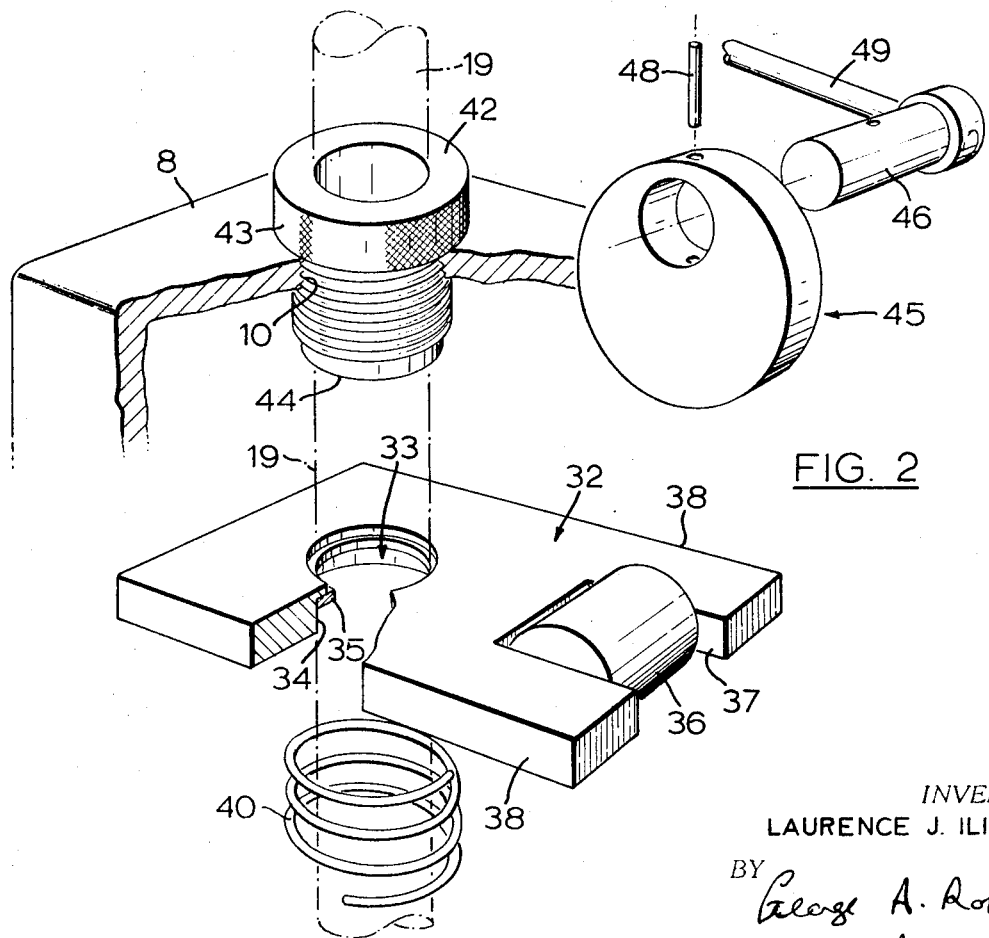

Inventor
LAURENCE J. ILINES
by: George A. Rolston

PRESSURE RELIEF APPARATUS FOR POTATO DOUGH EXTRUDER

The invention relates to a potato dough extruder incorporating a pressure shaft actuating means having built-in pressure relief capability. The present application is a continuation in part of my co-pending application, Ser. No. 819,801 filed Apr. 28, 1969, now abandoned.

Potato dough extruders are known in the art of food product conversion machines, examples being U.S. Pat. No. 3,344,752, Canadian Letters Patent 548,824, and there are many other examples in the patent art of food product extrusion devices for use in association with other types of food products. Such machines generally comprise a cylindrical barrel, an extrusion die at the lower end, and a pressure plate at the upper end. Some form of pressure shaft engages the pressure plate and a shaft actuating means is provided for forcing the shaft downwardly to extrude the contents of the cylindrical container. Various different shaft operating mechanisms have been proposed in the art, but they all exhibit various different disadvantages for the particular operation of extruding potato dough. In the first place, apparatus of this kind is used by almost totally unskilled labour at drive-in restaurants and the like, and its operation must therefore be of the utmost simplicity and completely fool proof, even when it is deliberately abused. Secondly, the apparatus must be such that it can be manufactured economically on a mass production basis so that the machines can be installed in a large number of drive-ins, at a cost which is sufficiently low to permit the owner of the restaurant to purchase the machine, and still realize a saving in the over-all cost of his operation, by being enabled to use powdered potato dough for making french fried potatoes, in place of employing hand labour to peel the potatoes. The operation of the extruder develops very substantial pressures in the cylinder, and it is necessary, in the construction of such an apparatus that the system for moving the pressure shaft should provide the operator with a very substantial mechanical advantage, in order to reduce the physical effort required to extrude individual servings of french fried potatoes. With the assistance of such a highly efficient manual drive system, it is quite common for breakages to occur in the equipment when it is operated by unskilled personnel. For example, when the plunger or piston reaches the bottom of the cylinder, there is invariably a small quantity of potato dough left which cannot be extruded. However, the operator of the machine will invariably attempt to obtain one or more extra servings by applying extra pressure, with the result that the extrusion die is sometimes broken, or the die becomes separated from the bottom of the cylinder, or the pressure shaft in some cases damages the plunger. A further, although somewhat less serious defect of the prior art mechanism is what may be called the "tooth paste tube effect." Thus the apparatus is required to extrude a single serving of french fried potatoes which are then cut off at the bottom of the extrusion die and cooked. Preferably, no further potato dough should be extruded after cutting off of the one serving required. However, due to the design of the prior art type shaft actuating systems, the plunger or pressure plate within the cylinder continues to exert a certain residual pressure on the dough within the cylinder, and small quantities of dough will continue to be extruded from the cylinder after the individual portion has been cut off, somewhat in the manner in which tooth paste will continue to emerge from a tube after the finger pressure has been removed. This causes a certain minor degree of wasteage of potato dough, but, more seriously, the residual portions of dough will hang beneath the extruding die and dry out and crumble. It is then necessary to cut off such residual portions of dough prior to extruding the next serving, thereby wasting time and effort.

The present invention is directed to overcoming these various problems, by providing a shaft actuating system which engages the shaft in a frictional grip, rather than by means of a positive engagement such as is provided by teeth or a rack and pinion, and in which the frictional grip is released at the end of each stroke, thereby relieving the pressure. Such a system has a two fold advantage that it is impossible for the pressure in the container to build up between strokes of the actuating mechanism, and it is therefore impossible to overload the interior of the container and cause damage, and in addition, the so-called "tooth paste tube effect" is avoided, since the pressure is automatically relieved at the end of each stroke.

More specifically, it is an objective of the present invention to provide a potato dough extruding machine incorporating pressure shaft actuating means providing a great mechanical advantage for the operator, and being capable of operation by a semi-rotary movement of an operating lever, in an upward and downward direction and incorporating shaft engagement means adapted to engage the shaft at the upper end of the stroke, and to release the shaft at the lower end of the stroke.

The foregoing and other advantages will become apparent from the following description of a preferred embodiment of the invention which is given here by way of example only with reference to the following drawings in which like reference devices refer to like parts thereof throughout the various views and diagrams and in which;

FIG. 2 is an exploded cut away perspective view of the pressure shaft actuating means seen from a point above and to the rear of FIG. 1;

FIG. 3 is a sectional side elevational view along the line 3—3 of FIG. 1, and showing the actuating means in a lower position;

Figure 1:
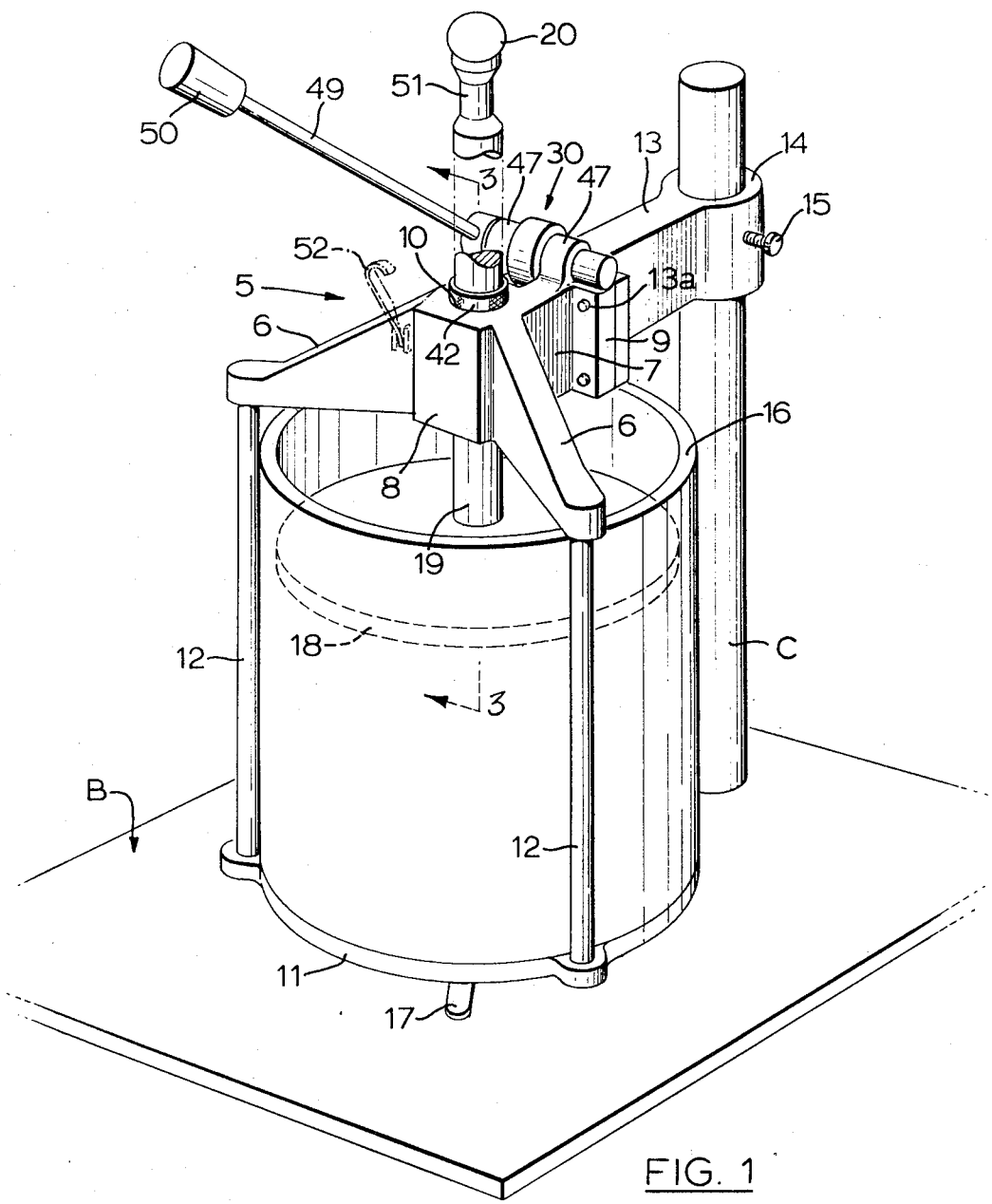
FIG. 1 is an upper perspective illustration of a potato dough extruding machine partially cut away to show the pressure shaft actuating means according to the invention.

Referring now to FIG. 1, it will be noted that this drawing shows a potato dough extruder having an upper star-shaped mounting frame 5 provided with two forwardly directed arms 6 and a rearward arm 7 which is of hollow cast construction, meeting at a central hub 8. Rear arm 7 is provided with a connection flange 9 and hub 8 is also hollow and is centrally bored as at 10 for purposes to be described below. A lower mounting plate 11 is connected below frame 5 by support rod means 12 extending between arms 6 and 7 of frame 5 and lower mounting plate 11.

A base plate B is provided with an upstanding column C and the entire extruder is adjustably supported thereon by cantilever arm 13 connected to flange 9 of rear arm 7 by bolts 13A and having a sliding collar 14 riding on column C secured by set screw 15.

A removable cylindrical container 16 is located seated on ring 11, and ring 11 is provided with a central opening (not shown) supporting an extruding die (not shown) having a series of extrusion openings therein for forming dough into suitably shaped french fried potatoes. Beneath ring 11 is a cut off unit (not shown) operated by a cut off handle 17, the function of which is to cut off the lengths of dough after they are extruded. Within the container 16 is provided a plunger member 18, operated by a pressure shaft 19. The precise details of the foregoing features are omitted from this description for the sake of clarity and it is believed that sufficient information can be obtained by reference to one or other of the prior art patents referred to above. As stated, the potato dough which is located within the cylinder 16 is extruded by means of pressure applied through the plunger 18, which is in turn operated by the pressure shaft 19. In certain prior art machines, provisions have been made for mechanically moving shaft 19 both downwardly and upwardly. However, in the present invention, this has been simplified by providing a mechanical means for forcing the shaft 19 downwardly, upward movement being achieved by hand, by means of grasping the handle or knob 20 and drawing the shaft 19 upwardly. It will therefore be understood that the pressure shaft actuating means now to be described operates only to force the shaft 19 and plate 18 downwardly.

The shaft actuating means according to the invention is indicated by the general reference arrow 30. It will be seen to be located substantially within the interior of the hollow cast rearward arm 7 and central hub 8. Access is provided to the hollow interior of rearward arm 7 through an opening 31 provided in connection flange 9, which is of course concealed and closed by cantilever arm 13.

Referring now to FIGS. 2 and 3 the shaft actuating means is there shown to comprise a plate-shaped lever member 32 having a central opening 33 formed therethrough of a diameter somewhat greater than the diameter of pressure shaft 19 whereby to permit lever member 32 to rock relative to the axis of shaft 19 without contacting the same. Opening 33 is upwardly counterbored as at 34 for approximately one half of the thickness of lever member 32, and within counterbore 34 there is provided a hardened steel gripping ring 35. Ring 35 has an interior diameter less than the diameter of opening 33, but slightly oversize in relation to the diameter of shaft 19 whereby to permit ring 35 to slide on shaft 19, but being sufficiently close to the diameter of shaft 19 whereby to grip and frictionally engage shaft 19 when lever 32 is rocked out of a plane normal to the axis of shaft 19. It will be noted that opening 33 is provided towards one end of lever member 32, and at the opposite end of lever 32 a roller cam follower 36 is rotatably mounted in any suitable manner such as in the rectangular notch 37. Lever member 32 is dimensioned in relation to the interior dimensions of the hollow rearward arm 7, whereby to provide a loose degree of engagement between the side edges 38 of lever member 32, and the interior opposed side walls 39 within arm 7, whereby to guide the upward and downward movement of lever member 32.

It will be understood from the foregoing that lever member 32 is movable both in a rocking motion, from a normally horizontal position to a slightly angled position, relative to the axis of shaft 19, and is also movable, within the confines of the interior of hub 8 and rear arm 7, between upper and lower positions. In order to locate the lever member 32 normally in the upper position, a compression spring 40 is provided, located around shaft 19, and extending between the lower wall 41 of hub member 8 and the counter bore 34 of lever member 32. For purposes to be described below, it is desirable that the upper position of lever member 32 should be capable of being adjustably located, and for this purpose, a bearing sleeve member 42, externally threaded, so as to engage the internally threaded axial bore 10 in the upper portion of hub 8, is provided, having an upper knurled ring 43 for manual rotation thereof, and having a lower end 44 adapted to engage the upper member 32 and define an upward limit of movement. A lower bearing sleeve 42a is also provided in the lower wall 41.

In order to both rock lever member 32 out of its normal horizontal position, and also to drive lever 32 downwardly, under a substantial mechanical advantage, there is provided a substantially cylindrical cam member 45 excentrically mounted on a cam operating shaft 46, with cam member 45 in engagement with follower member 36 of lever member 32. Journal bearings 47 are formed integrally with rear arm 7 to locate shaft 46, and cam member 45 is fastened to shaft 46 by any suitable means such as a locking pin 48. An operating arm 49 is attached to the free end of shaft 46, and is provided with a handle 50 by means of which lever 49 may be grasped and drawn forwardly towards the front of the machine.

In operation, the operator fills the cylindrical container 16 with a suitable quantity of potato dough formed of a mixture of potato flour and water in a well known manner, and the cylinder 16 is placed into position and the plunger 18 is introduced into the upper end of cylinder 16. Plunger member 18 may then be pushed downwardly into the container 16 by hand pressure applied to knob 20 at the upper end of shaft 19, until such time as plunger 18 engages the upper surface of the potato dough. At this point, further movement under simple hand pressure will become impossible. The machine is then ready for use to extrude dough in the form of french fried potatoes. When it is desired to extrude a serving of such french fried potatoes, the operator simply grasps the knob 50 of handle 49 and draws handle 49 forwardly and downwardly towards him. Such movement produces a semi-rotary movement of shaft 46 and cam 45 attached thereto. Such movement of cam 45 will then first cause lever member 32, through the engagement of cam follower 36, to tilt out of its normal horizontal position. As lever member 32 tilts the hardened steel ring 35 will bite into the surface of shaft 19, and as rotary movement of cam 45 continues, lever member 32 will be driven downwardly thereby forcing shaft 19 downwardly in unison therewith. Downward movement of shaft 19 forces plunger 18 downwardly thereby generating substantial pressure within the container 16 which causes extrusion of potato dough through the extrusion die in a manner described in connection with the aforesaid earlier patents. The lower limit of travel of handle 49 is defined by the position of engagement between handle 49 and arm 6 of frame 5, although obviously some other form of limit setting device could be included. At this point, the operator merely releases handle 50, and the force stored in compression spring 40 will cause lever member 32 to move upwardly thereby causing cam 45 to rotate in the reverse direction and raise operating arm 49 and handle 50 to its upper position once more. At the same time it will be understood that the moment spring 40 commences to raise lever member 32, the grip applied by hardened steel ring 35 to shaft 19 is released, thereby immediately releasing the pressure generated within the container 16. In fact in many cases, it will be found that plunger 18 and shaft 19 will rise very slightly to relieve such pressure, thereby materially assisting in the raising of lever member 32 and the reverse rotation of cam 45. Upward movement of lever member 32 is of coursed checked upon engagement with the lower portion 44 of bearing sleeve member 42. The extruded lengths of potato dough may then be cut off from the lower side of the extrusion die (not shown) by operation of cut off handle 17 in known manner. Since, at this point all pressure within container 16 has been relieved, there is no tendency for further extrusion to take place through the die, after the cut off arm 17 has been operated.

In order to regulate the length of the portions of dough which are extruded on each stroke of operating arm 49, all that is required is for the operator to merely grasp the knurled portion 43 of bearing sleeve 42 and rotate it either upwardly or downwardly. Clearly upward rotation of sleeve 42 will cause lever member 32 to adopt a higher position thereby providing it with a longer stroke and resulting in a somewhat greater length of french fried potato, and movement of sleeve member 42 in the reverse direction will of course shorten the extruded length of french fries.

When the contents of cylinder 16 are substantially exhausted, and plunger 18 has reached almost to the bottom of cylinder 16, the reduced portion 51 of shaft 19 will just have reached the region of the upper position of lever member 32, the length of shaft 19 being measured to ensure that this takes place at this point. The next time the operating arm 49 is moved forwardly, lever member 32 will tilt as before, but the ring member 35 will not be able to engage any portion of shaft 19, since the reduced portion 51 thereof is too small to be contacted by ring 35. Thus although lever member 32 will be moved by cam member 45 as described above, it will not apply any downward force to shaft 19. In this way, complete safety of the operation of the machine is ensured notwithstanding the hasty attempts of an operator to obtain one last serving of french fries from the machine before recharging container 16.

Obviously, the charging of container 16 is a simple operation. The knob 20 is grasped and the shaft 19 is drawn upwardly thereby raising plunger 18 out of container 16 after which container 16 may be removed, washed out, and re-charged and the entire operation can then continue. In some cases, it may be desirable to provide some form of means for locking the shaft 19 in the upper position thereby leaving both hands free to remove container 16. If such a locking means is considered desirable, it can take the form of a device such as a clip member indicated in phantom as 52 on FIG. 1 may be provided, which can be applied to arm 49 and lock it in a lower position, thereby effectively holding shaft 19 against downward movement.

It will further be noted that the construction of the device and particularly the shaft operating means involves a minimum of machined parts and that the frame member 5 including arm 6, hub 8, and rear arm 7 may all be cast in one piece, thereby materially reducing the construction costs. In addition, the assembly and disassembly of the entire mechanism can be performed substantially without any special tools. All that is required is to release bolts 13A, after which access may be had to the interior of hollow arm 7. The lever member 32 may be removed and replaced by merely, for example, removing knob 20 from the upper end of shaft 19 after which shaft 19 may be drawn completely out of hub 8 thereby leaving lever member 32 free to be removed. Thus the only part to be subjected to any very substantial wear may be regularly serviced and maintained in good condition without any difficulty by the operator of the machine itself.

Figure 4:
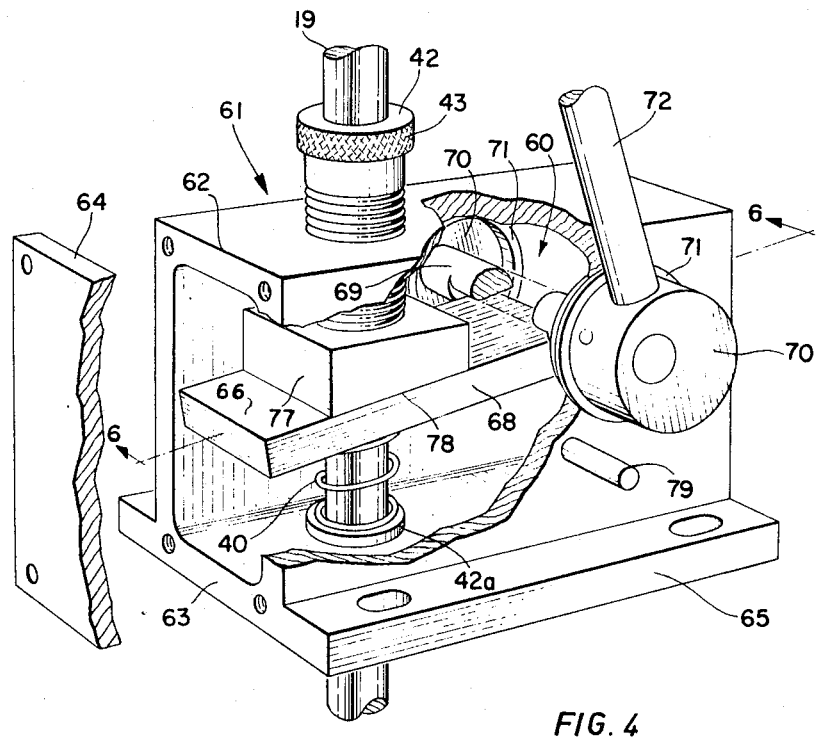
FIG. 4 shows a perspective cut-away illustration of a further embodiment of the invention.
Figure 5:
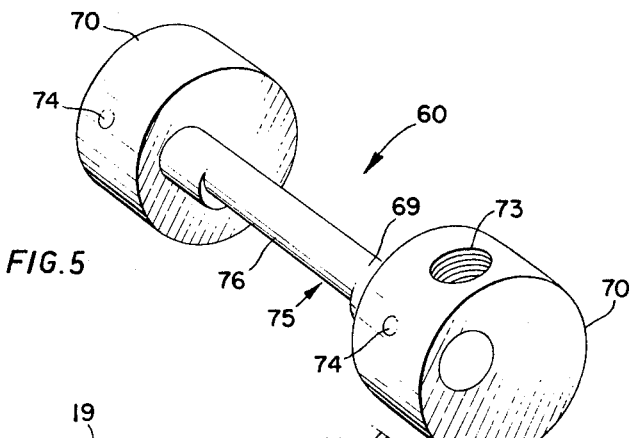
FIG. 5 is an enlarged perspective illustration of a detail of the embodiment of FIG. 4.
Figure 6:
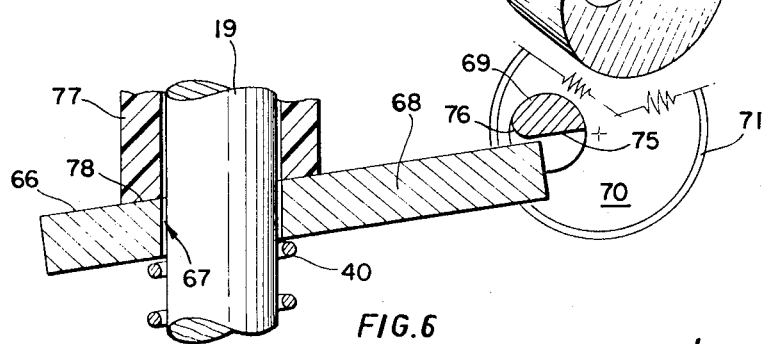
FIG. 6 is an enlarged section along the line 6—6 of FIG. 4 with a portion thereof shown in phantom.

According to a further embodiment of the invention shown in FIGS. 4, 5 and 6, the design may be further improved and modified, by replacing the cam assembly 30, and the cam 45 by an improved cam assembly indicated in FIGS. 4 and 5 by the general reference 60, by means of which the entire cam assembly may be enclosed so as to prevent the accumulation of food particles, or the contamination of food, or soiling of the operator's hand by machine lubricants or the like.

According to this preferred embodiment, a totally enclosed housing 61 is provided having top and bottom walls 62 and 63, and an end closure plate 64 removably attachable thereto by any suitable screw means (not shown). The housing 61 of course, merely replaces the hollow arm portion 7 of the embodiment of FIG. 1, or alternatively may be provided with mounting flanges 65 on either side thereof, whereby the same may be mounted by screws or bolts or the like on any other suitable supporting plate or arm performing the functional equivalent of the arm 13, the details of which are not shown for the sake of clarity. As in the case of the embodiments of FIGS. 1, 2, and 3, the pressure shaft 19 extends through the housing 61, through the slidable bearing means 42, provided in the upper wall 62 of the housing 61, and having a knurled edge or rim 43, and through a lower bearing sleeve 42a in the lower wall 63.

In this further embodiment of the invention, the drive lever is somewhat modified. The drive lever, identified as 66 in this embodiment, differs from the drive lever 32 of the embodiment of FIGS. 1, 2 and 3. The drive lever 66 is a plate of hardened steel, of a predetermined thickness, having an oversized bore 67 (see FIG. 7) formed therethrough at a predetermined angle, preferably in the region of from 10° to 14° off the perpendicular. The bore 67 should be sufficiently oversize in relation to the diameter of the shaft 19, that the shaft 19 may slide freely through the bore 67 when the bore 67 is aligned precisely with the axis of the shaft 19. Such precise alignment will occur, of course, when the drive lever 66 is angled out of the horizontal, or in any event, is angled relative to the drive shaft 19 by an angle equal to the angulation between the axis of the bore 67 and the perpendicular to the plate 66. An end 68 of the drive lever 66 extends into contact with the cam rod device 69. The cam rod 69 extends between two oversize hub members 70, and is offset from the centres of the hub members 70 as shown. Hub members 70 are themselves rotatably mounted in the opposed side walls of the housing 61 in the inset journal bearings 71, and the right-hand hub member 70 is provided with an operating arm 72 fastened in the threaded recess 73. The cam rod 69 is fastened in the hub members 70, by means of the pins 74 to prevent rotation thereof. Cam rod 69 is of cylindrical cross-section at each end, and in the intermediate portion thereof, it is cut away as at 75 and provided with a rounded bevelled edge 76, to minimize friction between the edge 76 and the extension portion 68 of the drive lever 66. As in the embodiment of FIGS. 1, 2 and 3, a spring 40 is provided around shaft 19, to hold the drive lever 66 in its upper position. In addition, in order to hold the drive lever 66 in its predetermined angled position as shown in FIGS. 5 and 7, when in the upper position, a sliding collar member 77 is provided around shaft 19, having a lower bearing surface 78 cut at an angle corresponding to the angle in which it is intended that the lever member 66 shall lie when in its inoperative position. In this way, when the lever member 66 is pressed upwardly by the spring 40 against the bearing surface 78, the lever member 66 will lie in the predetermined desired angular position, whereby to permit free sliding of shaft 19 upwardly and downwardly. The sliding collar member 77 is formed in a rectangular or square shape as shown, and is dimensioned to fit loosely between the sides of the housing 61, so as to prevent inadvertent rotation thereof in use.

Any suitable stop means such as the check rod 79 may be provided to prevent excessive movement of the handle 72 and the cam rod 69.

In operation, the drive lever 66 will normally be in its upwardly tilted position as shown in FIGS. 4 and 6, with the axis of bore 67 aligned with the axis of shaft 19. In this position, the spring 40 is urging the drive lever 66 upwardly against the lower bearing surface 78 with the sliding collar 77 which functions to hold the drive lever 66 at the desired predetermined angle. As soon as the operator pulls the handle 72 towards the front of the machine in an anti-clockwise direction, the hubs 70 rotate, and cause the cam rod 69 to move around an arc of a circle, bringing the bevelled edge 76 into contact with the extended end portion 68 of the drive lever 66. As the rotary movement is continued, the bevelled edge 76 will tilt the extension portion 68 of the lever member 66 downwardly, thereby bringing the edges of the lever member 66 around the bore 67 into contact with the shaft 19. Continued rotation will cause the bevelled edge 76 to move still further downwardly, and force the entire lever member 66 and shaft 19 to move downwardly, and thereby extrude dough from the cylinder in the manner described above.

As soon as the handle 72 is released by the operator, the spring 40 will force the drive lever 66 upwardly, and cause the cam rod 69 and hub members 70 to rotate in the reverse direction, and the sliding collar 77 will be pressed upwardly against the lower end of the bearing sleeve 42. As soon as such contact is made, the spring 40 will then force the drive lever 66 into the upwardly tilted position again, thereby releasing the hold on the drive lever 66 on the shaft 19. The shaft 19 will then drop under its own weight downwardly until checked by contact of the pressure plate with the dough in the cylinder. The operator may then make a further movement with the handle 72 thereby extruding further dough.

In this form of the invention, it is found that the arrangement of the cam rod 69 and the bevelled edge 76 located towards the outer circumference of the hub members 70, provides a highly effective cam action in which the degree of leverage obtained between the handle 72 and the axis of rotation of the hub members 70, and the point of contact between the bevelled edge 76 and the extension portion 68, becomes progressively greater as the handle 72 is further depressed, thereby providing an increasing degree of leverage as the pressure builds up within the cylinder.

The foregoing is a description of a preferred embodiment which is given hereby way of example only. The invention is not to be taken as limited to any of the specific features as described, but comprehends all such variations thereof as come within the scope of the appended claims.

What I claim is:

1. Incremental pressure apparatus for use in association with machines for extruding food product dough such as potato dough and the like of the type having upper and lower supporting members spaced apart and removably receiving a dough receiving cylinder and extrusion die therebetween, said cylinder incorporating a pressure piston, said pressure apparatus comprising;

a housing associated with said upper supporting member of said machine;

upper and lower openings in said housing arranged on a common vertical axis;

pressure shaft means extending through said openings for application of pressure to said piston in said cylinder;

releasable frictional shaft gripping means extending around said shaft within said housing, said gripping means being normally oriented in a shaft releasing position and being tiltable relative to the axis of said shaft to frictionally engage same, said gripping means being additionally movable upwardly and downwardly on a substantially vertical path within said housing between upper and lower positions, and manually operable drive means mounted on said housing and engageable with said gripping means and operable to first tilt the same into its said gripping position and then drive same downwardly along said vertical path into its lower position, said gripping means returning to its upper position upon release of said drive means.

2. Incremental pressure apparatus as claimed in claim 1 wherein said shaft gripping means incorporates a lever member of predetermined width and length, the width being greater than the width of said pressure shaft, and the length being greater than the width, an opening formed through said lever member for reception of said pressure shaft means therethrough, and shaft engaging means associated with said lever member.

3. Incremental pressure apparatus as claimed in claim 1 including a reduced neck portion at the upper end of said shaft means, said reduced neck portion being spaced from the lower end of said pressure shaft means a predetermined distance, whereby to bring said reduced neck portion into registration with said shaft gripping means to terminate further operation thereof at a terminal point just prior to engagement of said pressure piston with the lower end of said cylinder.

4. Incremental pressure apparatus as claimed in claim 1 including bearing sleeve means mounted in said upper opening in said housing for slidably receiving said pressure shaft means therethrough.

5. Incremental pressure apparatus as claimed in claim 1 wherein said shaft gripping means includes a lever member, an oversized opening formed through said lever for loosely receiving said pressure shaft therethrough; and a generally annular shaft engaging ring of hard material mounted in said opening in said lever member, defining an interior diameter less than that of said opening, and slidably receiving said shaft means therethrough.

6. Incremental pressure apparatus as claimed in claim 1 wherein said manually operable drive means includes a cam member, a shaft mounting said cam member in operable position and movable within said housing, and cam follower means associated with said shaft gripping means for engagement by said cam member.

7. Incremental pressure apparatus as claimed in claim 1 including a shaft for said manually operable drive means, shaft bearing means formed on said housing for rotatably receiving said shaft therein, and an eccentrically mounted drive member on said shaft, said drive member being dimensioned and oriented to engage said shaft gripping means as aforesaid.

8. Incremental pressure apparatus as claimed in claim 1 including a spring normally urging said shaft gripping means upwardly within said housing, and adjustable stop means mounted in said housing for defining an upward limit of movement for said shaft gripping means.

9. Incremental pressure apparatus as claimed in claim 1, wherein said shaft gripping means includes a lever member, an opening formed through said lever member which is oversize with respect to the diameter of said shaft, said opening being formed at a predetermined angle, whereby when the axis of said opening is aligned with the axis of said shaft, said lever member will be tilted relative to the axis of said shaft.

10. Incremental pressure apparatus as claimed in claim 1, wherein said shaft gripping means includes a lever member, tiltable between a non-operating position wherein the same is angled relative to the axis of said shaft, and an operating position tilted at a different angle, and including sliding collar means adapted to ride on said shaft within said housing, and having a lower surface angled relative to the axis of said shaft, at an angle substantially equal to the angle of said lever member when in its said non-operating position.

11. Incremental pressure apparatus as claimed in claim 1, wherein said manually operable drive means comprises oversize hub members mounted in opposite side walls of said housing for rotation in unison, cam rod means mounted between said hub members and offset with respect to the central axis thereof, and a contact surface formed on said cam rod means for contacting said frictional shaft gripping means.

* * * * *